United States Patent [19]
Smith

[11] Patent Number: 5,732,256
[45] Date of Patent: Mar. 24, 1998

[54] CD-ROM OPTIMIZATION AND STREAM SPLITTING

[75] Inventor: Matthew W. Smith, Tulsa, Okla.

[73] Assignee: Microsoft Corporation, Redmond, Wash.

[21] Appl. No.: 520,596

[22] Filed: Aug. 30, 1995

[51] Int. Cl.$^6$ ........................................... G06F 17/30
[52] U.S. Cl. .................. 395/601; 395/611; 364/419.19
[58] Field of Search .............................. 395/607, 611, 395/439; 364/419.19; 369/32

[56] References Cited

U.S. PATENT DOCUMENTS

| | | | |
|---|---|---|---|
| 4,536,836 | 8/1985 | Dodd et al. | 364/200 |
| 4,680,703 | 7/1987 | Kriz | 364/200 |
| 5,262,964 | 11/1993 | Bonsall et al. | 364/514 |
| 5,390,315 | 2/1995 | Blandy et al. | 395/425 |
| 5,394,382 | 2/1995 | Hu et al. | 369/32 |
| 5,398,222 | 3/1995 | Kim | 369/32 |
| 5,408,634 | 4/1995 | Joho | 395/425 |
| 5,594,881 | 1/1997 | Fecteau et al. | 395/419 |

OTHER PUBLICATIONS

Wang et al., "Reduction of seek time of hard disk drive by dead beat control", IEEE, pp. 39–44, Jan. 1994.
Reingold et al., "Data Structures", Little Brown&Company, Boston, pp. 250–270, Jan. 1983.
Phillips et al. "Implementation methodology for a CD–ROM english" IEEE pp. 484–487, Jul. 1993.
C.J.Date "An introduction to database systems" Eddison–Wesley pp. 712–730, Aug. 1995.

*Primary Examiner*—Thomas G. Black
*Assistant Examiner*—Jean M. Corrielus
*Attorney, Agent, or Firm*—Ronald M. Anderson

[57] ABSTRACT

A method and system for efficiently transferring data for objects on the page of a multimedia work from a CD-ROM to the memory of a computer. An application program is run on a personal computer (10) that enables an author to create a multimedia work. Certain types of objects can be selectively processed so that data for those objects are temporarily stored on a hard drive (16) as the work is being created, in a format that will reduce the time required to load the data and execute the objects when the work is subsequently played from a CD-ROM. In this technique, the sequence in which the objects on a page are required is determined and the data for each of these objects are split into a header portion and a tail portion. The header portions of the data for the objects are stored consecutively in that sequence on the hard drive, preferably followed by the tail portions of the data for the objects. This process is repeated for each of the objects on the other pages of the multimedia work. The data stored in nonvolatile memory are then transferred to a CD-ROM master and stored in the same contiguous sequence. The CD-ROM master is used to make other copies for distribution. As the work is played from a CD-ROM, the header portion of each of the objects on a page is loaded into computer memory at the time that the page is instantiated, enabling the page to appear more quickly. The tail portions of each of the objects are then loaded into the computer memory as each of the objects is called to execute. By employing this technique, less time is required for transferring the data for the objects from the CD-ROM to the computer memory before execution of the multimedia work begins, and the work executes more smoothly, since less time is required to transfer the data for each object as the object is required to execute.

30 Claims, 6 Drawing Sheets

CD-ROM OPTIMIZATION AND STREAM SPLITTING

FIELD OF THE INVENTION

The present invention generally relates to data storage on a nonvolatile medium, and more specifically, to a method and system for optimally storing data on a medium such as a compact disk-read only memory (CD-ROM), so as to minimize the time required to load the data into a computer to run a multimedia work that uses the data.

BACKGROUND OF THE INVENTION

The term "multimedia" as used herein refers to computer programs that combine audio and visual components in a single work. These components can be in the form of videos that run in a window on the computer display screen, animations, still images (photographic or computer generated), Redbook audio (sound in conventional music CD format), wave files (digitized sound), and/or MIDI files (used to produce music or other sounds by controlling a sound board in the computer or an external music synthesizer). These multimedia components can be combined in unlimited ways by an author to create entertaining and/or educational works that appeal to a wide range of users.

Because a multimedia work often includes hundreds of megabytes of data, the current most popular storage and distribution medium for such works is the CD-ROM. The CD-ROM is ideal for storing large amounts of data, but it has significant speed limitations in accessing that data. The "seek" time of a CD-ROM, which is the time needed for the read head in the drive to move from one track position to access data that are stored in another track, is the most significant limitation in "playing" a work stored on this type of medium. The seek time inherently determines the time required to load data from the CD-ROM disk into the computer's memory for execution. Although the data transfer rate of CD-ROM drives continues to improve, as evidenced by the growing availability of quad-speed drives, the seek time has not so dramatically improved. Even the faster quad speed drives are faced with the same mechanical limitations in moving the read head radially across the disk to access data recorded on different tracks of the CD-ROM.

One way to minimize delays caused during playback of a work recorded on a CD-ROM is to load all of the data required for all objects of a portion of the multimedia work that is to be played, e.g., a page, into the random access memory (RAM) of the computer before that portion is executed by the computer's processor. However, the time required to load the data before starting to play the page can be several seconds. To a user, a wait of several seconds before a selected portion of the work begins to execute on the computer can seem an unacceptably long time. If none of the data for the objects on a page of the work were loaded into RAM until the instant that each object must be executed, the page could not be opened or initialized with all of its objects in place. Instead, there would be a delay for each object to load and the objects of the page would appear (be executed) incrementally, one object at a time. Clearly, this method for loading objects from a CD-ROM is unacceptable, because of the effect that it would have on playing each page of the work.

However, the delay that results from loading all of the data for all of the objects on a page of a multimedia work before the page opens on the display or begins playing disrupts the smooth transition between successive pages in the work. As more objects are used on a page, the total seek time required to access all of the data representing those objects on a CD-ROM increases, making the disruption in the smooth playing of the work more evident. It should therefore be apparent that a different approach is required for loading the data stream corresponding to the objects on each page into computer RAM from a CD-ROM as a multimedia work is played.

SUMMARY OF THE INVENTION

In accordance with the present invention, a method is defined for minimizing the time required to load data into a computer from a nonvolatile storage device. There are several different types of data that can be loaded using this invention. Each type of data is associated with a different object in a work and includes a header section and a tail section. The method begins by identifying a plurality of objects for which the associated data stored on the nonvolatile storage device must be loaded into the computer. Next, a sequence for loading the objects is determined. The header sections for the objects are then stored in contiguous blocks on the nonvolatile storage device, in the sequence in which the objects are to be loaded when the work is played. In this manner, the data associated with the plurality of objects is efficiently loaded into the computer, with a minimum seek time required to access the data when needed while playing the work.

Preferably, the tail sections of the data for the plurality of objects are stored in contiguous blocks on the nonvolatile storage device, in the sequence in which the objects are to be played (executed). In one preferred form of the invention, the header section of the data associated with an object is required by a program running on the computer to initially create an instance of the object in a multimedia work executing on the computer. However, the tail section of the data associated with an object is not required until the object is executed on the computer, and the tail section is loaded into the computer for execution at that time.

The method further comprises the step of copying the data for the objects from the nonvolatile storage device to a CD-ROM. The blocks of data associated with the objects are arranged in circumferential tracks on the CD-ROM, stored in the same order as in the nonvolatile storage device.

In addition, the method comprises the step of identifying a plurality of pages with which different objects are associated. The objects on each page are then processed to determine the sequence in which the header sections and the tail sections of the data associated with each object on the page are to be stored in blocks on the nonvolatile storage device.

Before storing the data associated with the objects, the header section of the data associated with each object is bound to a handler for that object. The binding process uses a handler specific to the type of data being bound.

Another aspect of the present invention is directed to a system for creating a multimedia work that is stored on a nonvolatile medium. The system includes a processor that executes program steps stored in a memory to store data associated with the objects of a multimedia work. The program steps cause the processor to implement functions that are generally consistent with the steps of the method described above.

A still further aspect of the present invention is directed to an article of manufacture that is adapted to be used with a computer. The article of manufacture includes a memory medium on which are stored machine instructions for use in minimizing the time required to load data into a computer from a nonvolatile storage device. When executed on the computer, the machine instructions implement functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
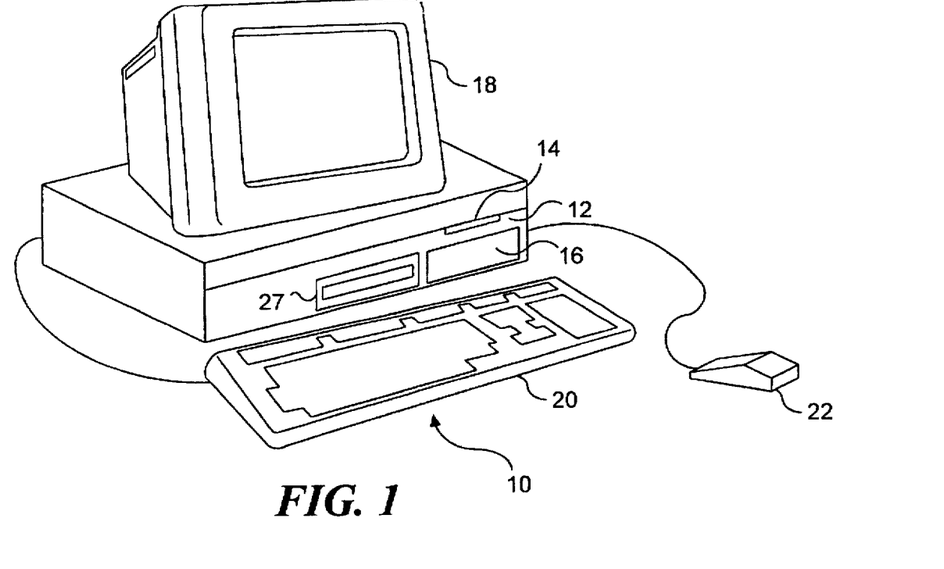
FIG. 1 is an isometric view of a computer system suitable for implementing the present invention when creating a multimedia work that loads more efficiently from a CD-ROM.

The present invention is intended to be implemented on a personal computer 10, such as that shown in FIG. 1. Personal computer 10 is generally conventional in design, including a processor chassis 12 in which is disposed a 3½ -inch floppy disk drive 14 and a hard drive 16. Both floppy drive 14 and hard drive 16 are used for storing executable files and data files, the floppy drive enabling those files to be transported, e.g., between personal computer 10 and another computer (not shown). In addition, personal computer 10 includes a monitor 18, which is preferably capable of graphic resolutions of at least 640×480 pixels, at 256 colors. A keyboard 20 and a mouse 22 are coupled to the personal computer to enable the user to control applications executing on the computer and to provide alphanumeric and graphically selected input to such programs. Personal computer 10 is a multimedia-type computer, including an internal sound card (not shown in FIG. 1) and a CD-ROM drive 27.

Figure 2:
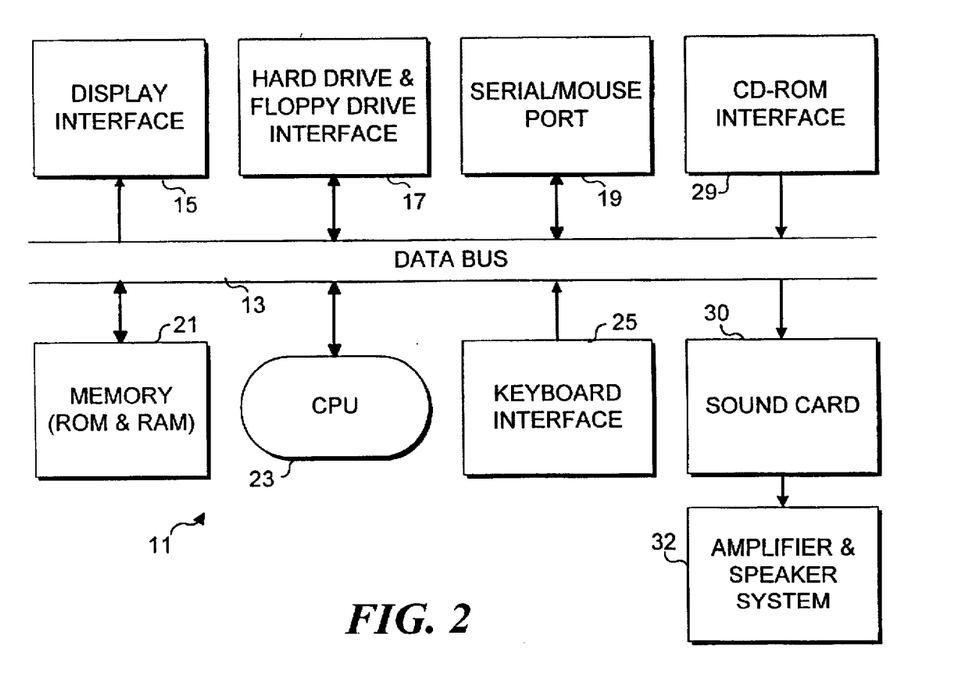
FIG. 2 is a block diagram that illustrates the functional blocks of the computer system on which the present invention is implemented.

Internal components of processor chassis 12 are illustrated in FIG. 2, in a block diagram 11. Inside processor chassis 12 are a central processing unit (CPU) 23 that is coupled to a data bus 13 for bi-directional communication of data and instructions. Also coupled to data bus 13 are a display interface 15 for driving monitor 18, a hard drive and floppy drive interface 17 for controlling floppy drive 14 and hard drive 16, a serial/mouse port 19, a CD-ROM interface 29 for controlling the CD-ROM drive, a memory 21 that includes both read only memory (ROM) and random access memory (RAM), a keyboard interface 25, and a sound card 30. An amplifier and speaker system 32 is coupled to sound card 30, enabling the user to play MIDI files, wave files, and Redbook audio that is recorded on a CD or CD-ROM disk. Further details of personal computer 10 and its internal components need not be further described, since multimedia-type personal computers are well known to those of ordinary skill in the art.

When implementing a preferred embodiment of the present invention to store data for efficient retrieval, CPU 23 executes a multimedia work authoring program developed for Microsoft Corporation and referred to as SYMMETRY™. This program enables an author to produce a multimedia work that is initially stored on hard drive 16 and subsequently transferred to a master CD-ROM disk.

The SYMMETRY authoring application is intended to run under a graphic user interface, such as Microsoft's WINDOWS™ operating system. It is also contemplated that the present invention will be implemented on other types of computers and under other types of graphic operating systems, such as Apple's SYSTEM7™. Although the SYMMETRY application is specifically written for creating multimedia works, in a broader sense, the present invention that is implemented by this application can be employed for storing other types of data that are not part of a multimedia work. Thus, the invention could also be implemented in a non-graphic user environment, for example, under MS-DOS or a UNIX operating system. Furthermore, the present invention can be incorporated in other types of applications, running on almost any type of computer or workstation. A primary feature of the present invention is its ability to store data in a format that enhances the rate at which the data is loaded for execution by a computer. In the preferred embodiment, the data define a plurality of objects that comprise a multimedia work. In this preferred application, the invention is used to ensure that the time required to transfer the data from a CD-ROM on which the data are stored is minimized when the multimedia work is run. This function is implemented by minimizing the seek time for the read head in the CD-ROM drive when transferring the data for an object into the memory of the computer that is playing a multimedia work. When the work is produced by an author using SYMMETRY™, personal computer 10 is used by the author to create, edit, and assemble the various objects comprising successive pages of the multimedia work. As the work is created, the data defining it are stored on hard drive 16 for subsequent use in creating a CD-ROM master that will be used for publishing the work by producing multiple copies of the CD-ROM. Each of these copies is intended to be run on a multimedia machine such as personal computer 10, having the capability to display the objects on monitor 18 and to play sound objects through sound card 30. Thus, the computer used to play the multimedia work is generally equivalent to that used to create it. In other words, personal computer 10 is an example of a computer that can serve both purposes.

Figure 3:
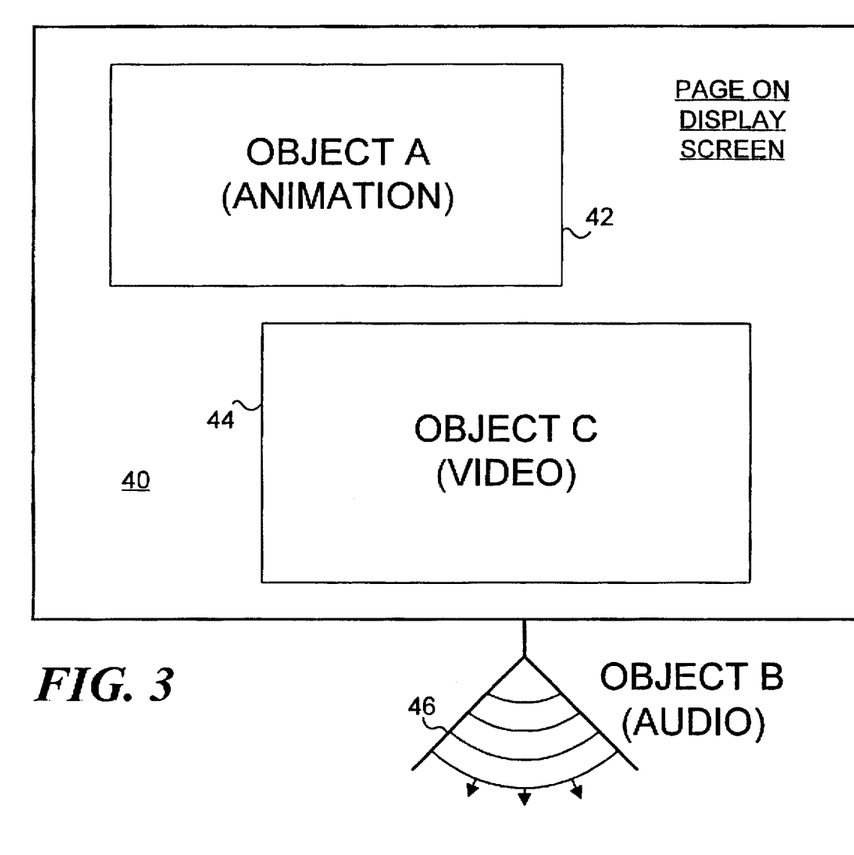
FIG. 3 is a functional block diagram showing an exemplary page of a multimedia work that can be stored and retrieved more efficiently using the present invention.

A typical multimedia work developed using the SYMMETRY authoring program includes a number of pages. Each page reflects a different subsection of the work generally corresponding to a different scene, subject matter, or background. As shown in FIG. 3, a page may include several objects, including visually perceptible objects that appear in different windows, such as windows 42 and 44 on a screen 40 that appears on monitor 18. In addition, the page may include one or more audio objects, represented by a speaker 46. In the simple example shown in this Figure, an object A represents an animation that appears in window 42, an object B corresponds to an audio object such as a wave file that is heard on speaker 46, and an object C represents a video sequence that appears in window 44. To simplify the example, the three objects are executed in sequence, although it will apparent that object B may run concurrently with either object A or object C.

Figure 4:
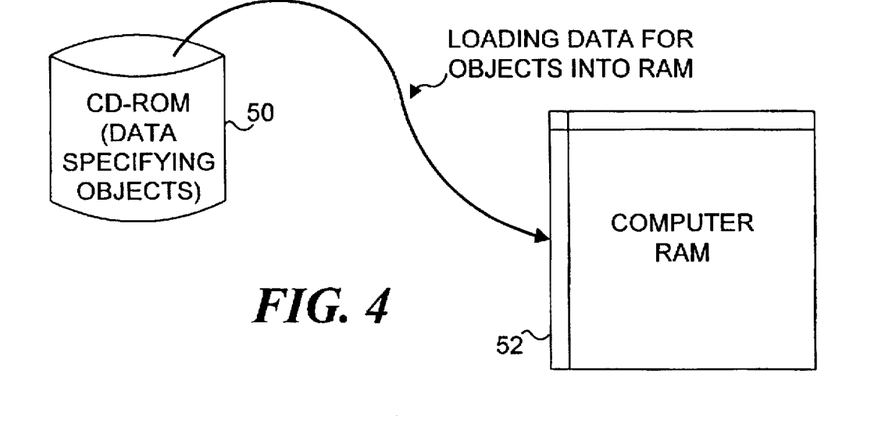
FIG. 4 is a schematic block diagram illustrating the loading of data specifying objects into computer RAM from a CD-ROM.

FIG. 4 illustrates the transfer of data for a multimedia work from a CD-ROM to a computer memory. When the multimedia work that includes the objects shown in FIG. 3 is played, successive pages are transferred from a CD-ROM 50 that includes the data specifying the objects into computer RAM 52 for execution by the computer running the work. Based upon the discussion provided above in the Background of the Invention, it will be apparent that the load time required for transferring data from the CD-ROM into the computer memory can impose a significant delay either in initially running each page of the work and/or between successive pages of the work. The primary cause of this delay is the seek time required for the read head in the CD-ROM drive to move from track to track to access the data required to define each object on a page of the work. The prior art would store the data for various objects in a multimedia work on a CD-ROM at random locations, without regard for the order in which the objects represented by the data are required in the multimedia work. In the simple example of FIG. 3, the time required to load all data for the three objects stored in this random manner might be acceptably short; however, as additional objects are added to the page, the user may be subjected to an unacceptably long delay before the page opens on the monitor and/or before sound is played from the speaker, due to the seek time required to access the data on the CD-ROM.

Figure 5:
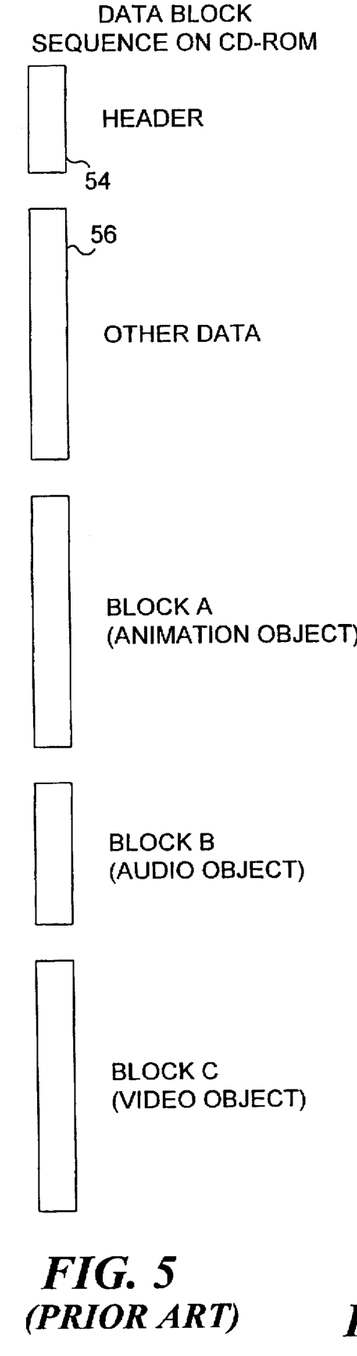
FIG. 5 (prior art) is a block diagram illustrating how data used to specify the objects of a multimedia work are normally stored on a CD-ROM.

FIG. 5 shows the conventional format for storing data for a page of a multimedia work on a CD-ROM on which the data are stored in blocks. As noted above, in the prior art, the blocks will likely be arranged on the CD-ROM in widely separated tracks. The page includes the data for the three objects of FIG. 3. However, some of the data required for the page is not specific to the three objects. For example, a header block 54 and other data in a block 56 define parameters that determine how the page will run on the computer when the multimedia work is played. The data in page header block 54 enables the page to be instantiated during the running of the work.

Disposed following the other data in block 56 is a block A that includes all of the data required to instantiate and run animation object A. Block A is followed on the CD-ROM by a block B, which includes all of the data required to run audio object B. Finally, a block C, which includes all of the data required to instantiate and run video object C, is provided. Since, based on the prior art approach, the blocks required for the page may extend over multiple tracks on the CD-ROM and those tracks may be widely separated, it may require several seconds to load the data for the animation, audio, and video objects in order to instantiate the page and initially begin playing that portion of the multimedia work on which those objects appear.

Figure 6:
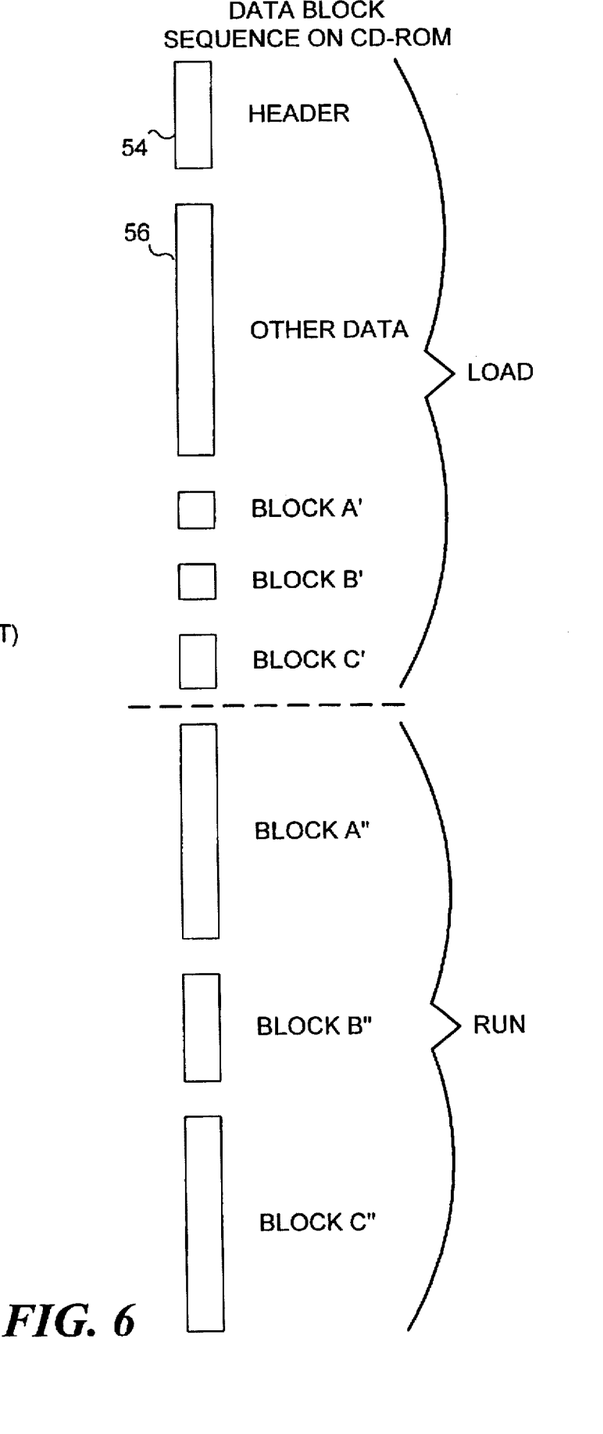
FIG. 6 is a block diagram illustrating how the present invention stores data specifying objects of a multimedia work, on a CD-ROM.

In comparison, as shown in FIG. 6, the present invention provides for a different format for storing the data defining each of the objects on the page than that used in the prior art. The page header information is stored in block 54, followed by the other data for the page in a block 56, just as in the prior art approach shown in FIG. 5. However, in the present invention, the data for each of the three objects on the page are broken up into a portion that is loaded from the CD-ROM to initially instantiate the page, and a portion that is loaded when the objects on the page are run. Thus, the data for the animation object is broken into a header portion in a block A' and a tail portion in a block A". Similarly, the data for the audio object and for the video object are respectively separated into a header portion in a block B' and a tail portion in a block B", and into a header portion in a block C' and a tail portion in a block C". Each of the header portions, i.e., blocks A', B', and C', are stored sequentially on the CD-ROM in the order in which they are loaded as the page is instantiated, enabling the animation object, audio object, and video object defined by the data to be instantiated on the page.

When each object on the page is sequentially executed, the remaining data defining the objects, which are stored in blocks A", B", and C", are respectively transferred from the CD-ROM. The data in blocks A", B", and C" are thus stored and loaded in the same sequence in which the objects are executed when the page is run. Since the header portions of each object are loaded as the page is instantiated, each object can be instantiated on the page at that time. As a result, there is relatively little delay in running the page or in executing each object. Since the header portions of the data for each object are in the proper sequence and are stored in that sequence on the CD-ROM, minimal seek time is required for transferring that data into the computer memory before the page appears on the monitor. Similarly, if several objects on a page execute in sequence and the remaining data that are necessary to execute each of the objects are also stored on the CD-ROM contiguously in the sequence in which the objects play, minimal time is required to transfer the tail portion of the data for each successive object before the object executes.

Figure 7:
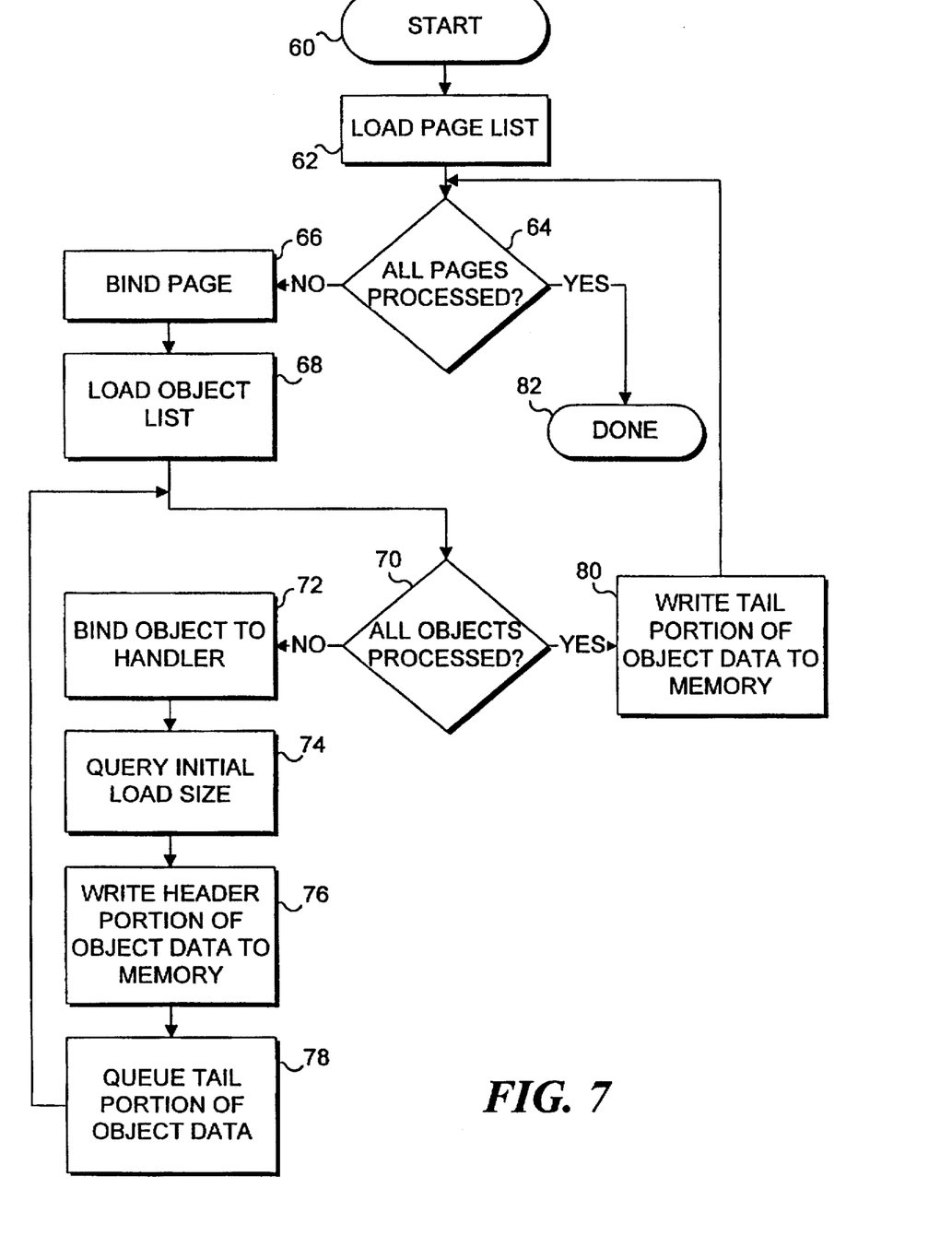
FIG. 7 is a flow chart illustrating the steps involved in processing pages of a multimedia work to store the data specifying objects on each page in accord with the present invention.

In FIG. 7, the steps implemented in the SYMMETRY authoring application to enable the data characterizing each object on a page to be stored in the split format of FIG. 6 is illustrated in a flow chart beginning at a start block 60. In a block 62, the program loads a page list, which identifies the pages comprising the multimedia work that are to be processed to determine how the data for the objects on the pages will be stored, in accordance with the present invention. At this point, it should be noted that not all objects comprising a page in a multimedia work can be split into a header portion and a tail portion. Specifically, bit mapped and other types of images, browse objects (which permit the user to search through a list to select an item), and MIDI file objects are not split into a header and tail portion. Generally, only objects that execute over time can benefit from the present invention. However, this invention can be applied, as suggested above, to animation objects, wave objects, and video objects.

A decision block 64 then determines if all pages of the multimedia work have been processed and if not, proceeds to a block 66 in which the current page being processed is bound. The step of binding a page simply refers to reading the header information for the current page being processed to identify the page parameters and providing this information to the page handler. Among those parameters is a list of all of the objects on the page. Therefore, the next step, which is noted in a block 68, provides for loading an object list that identifies each of the objects required for the current page.

Figure 8:
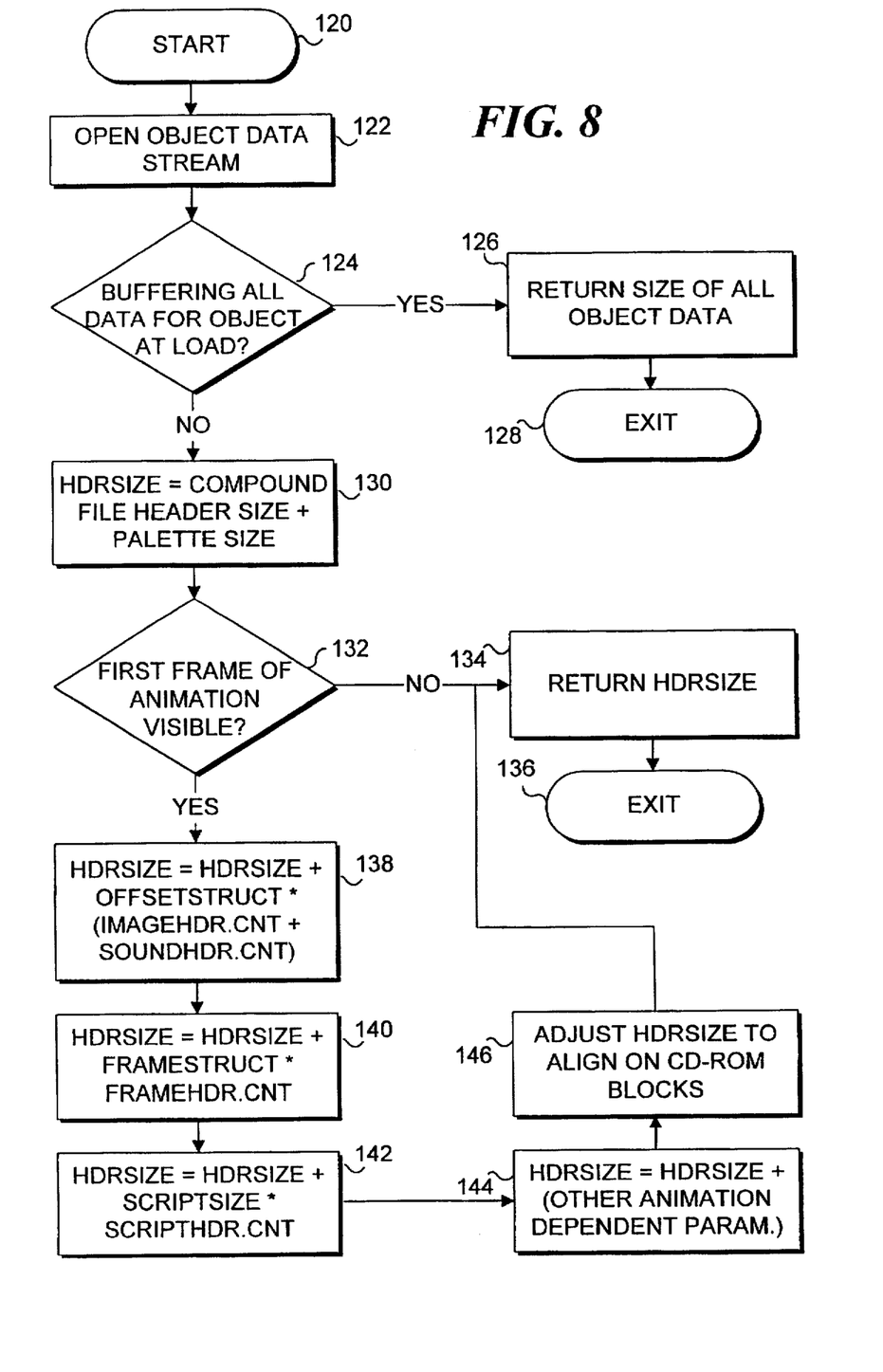
FIG. 8 is a flow chart showing the steps required to determine the header size in connection with one of the logical steps implemented in the flow chart of FIG. 7.

In a decision block 70, the program determines whether all objects on the current page have been processed. If not, in a block 72, the next object in the object list is bound to an appropriate handler. In this step, a file appropriate to handle storage of the current object and having a .DLL extension is loaded into RAM. The appropriate .DLL file is identified using an index to a table in which all of the handler .DLLs are listed; this index appears in the header data for the object. Each different type of object has its own .DLL handler that controls how it will be stored in nonvolatile memory. Since the data defining the object are stored on CD-ROM in the same sequence as originally stored in nonvolatile memory when the work was created, the functions performed by the object handler effectively determines how the data defining the object will be divided between the header portion and the tail portion. Once the object is bound to its handler, a block 74 queries a header sizing function to determine the initial load size for the header portion of the data for the object. All the remaining data for that object comprises the tail portion. The details of the header sizing function referenced in block 74 are illustrated in FIG. 8 for an animation object, beginning at a start block 120. In a block 122, the program opens the object data stream. Next, a decision block 124 determines if all of the data for the object are to be buffered at load time. If so, the user has elected to load all of the data defining the object when the page is being instantiated, which precludes splitting the data for the object into a header portion and a tail portion. In this case, a block 126 returns the size of all of the object data from the function, returning to the main routine in a block 128.

Figure 9:
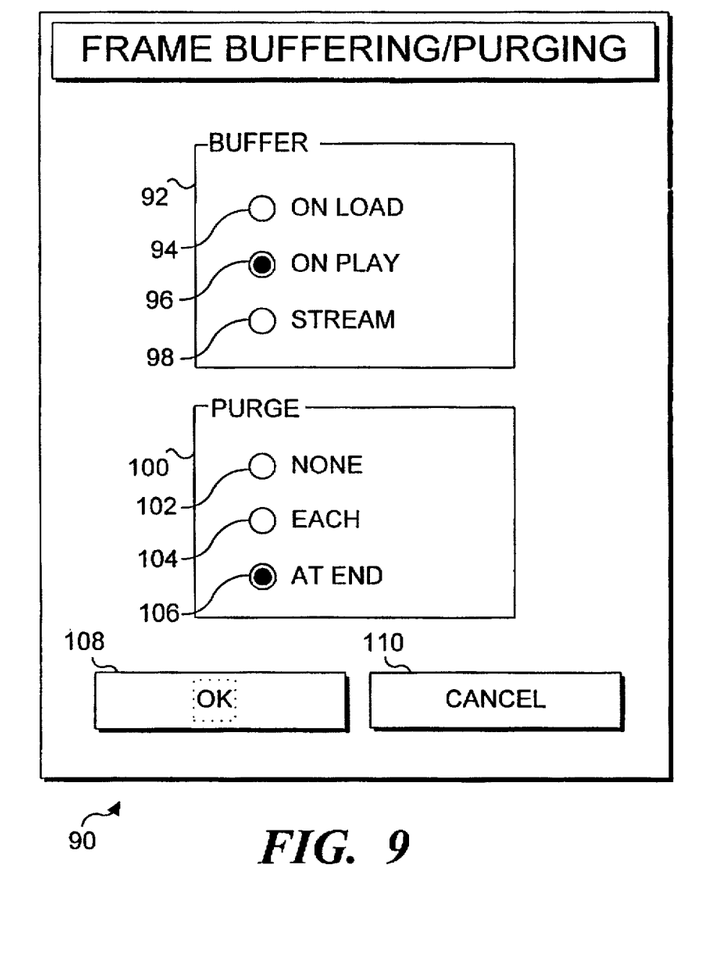
FIG. 9 is an exemplary reproduction of a dialog box in which the user can select various options that control how data defining a multimedia work are buffered in a cache and purged from the cache.

As implied by decision block 124, the user has the option of loading all of the data for an object at one time, when the object is instantiated with the page. This option is selected from a frame buffering/purging dialog box 90 as shown in FIG. 9. Dialog box 90 includes a buffer section 92 and a purge section 100. In buffer section 92, radio buttons 94, 96, and 98 can be selected to determine how the data for the object is buffered in a cache. If radio button 94 is selected, all of the data for the object are loaded when the object is initially instantiated. Conversely, radio buttons 96 and 98 enable the user to load the data for an object into a buffer at the time that the object is played, or to stream the data for the object on a continuous basis as the page opens. In purge section 100, radio buttons 102, 104, and 106 enable the user to determine how or whether the object frame cache is purged. Radio button 102 can be selected to indicate that no purging should occur, while radio buttons 104 or 106 can be respectively selected to indicate that the frame buffering cache for an object is cleared after each object is instantiated, or only at the end of the frame. The user confirms the decision by selecting an OK button 108, or can cancel the dialog box by selecting a Cancel button 110.

Returning to FIG. 8, if the user has not elected to buffer all of the data for an object when the object is initially loaded, the logic proceeds to a block 130, wherein a header size variable is set equal to the number of bytes in the compound file header and the number of bytes required to stipulate the palette for the object. A decision block 132 then determines if the first frame of the animation or other image is visible when the page opens. If not, a block 134 returns the current value for the header size and the routine exits in a block 136. However, if the first frame of the animation or other image is visible when the page opens, a block 138 continues to refine the size of the header portion of the data for the object, setting the size variable equal to the sum of the size determined in block 130 and the product of the offset structure for the object multiplied times the number of image headers and sound headers for the animation object. In a block 140, the header size is again set equal to the sum of the previous header size from block 138 and the product of the frame structure size times the number of frame headers for the animation. A block 142 further refines the header size by setting it equal to the sum of its previous value and a variable script size times the number of script headers in the animation. This process is again repeated for each other parameter, as suggested by a block 144, wherein the header size is set equal to its previous value from block 142 and all other animation-dependent parameters that can affect the header size. Since data for the first frame of an animation or other image that is visible when a page is displayed is included in the page header, it is important to determine the size of the frame or image.

In general, the header size of an animation object (or of other objects that are split between a header portion and the tail portion) is determined based upon the amount of data required to instantiate the object when the page is initially opened as the work is run on a computer. The computer must be provided sufficient data in the header portion to allocate memory and other resources necessary for the object to execute when called on the page.

A block 146 further adjusts the header size to align the header portion of the data for the animation object on a 2 Kbyte CD-ROM block. It should be noted that for other types of storage media, the alignment on a particular storage medium block edge may require that the data for the header portion be adjusted to a different size. As required, the header portion of the data for the object is padded with Null characters to achieve the size required to align the data with the medium block. Finally, in flow chart block 134, the function returns the header size required for the header portion of the object data and exits in block 136. A similar header size function is executed for each of the other types of objects that are split into a header portion and a tail portion.

Referring back to FIG. 7, the initial load size for the header returned in block 74 enables the program to write the header portion of the object data to nonvolatile memory, as noted in a block 76. Having determined the number of bytes required for the header portion of the object data, the remaining tail portion of the object data is temporarily queued, as noted in a block 78.

Flow chart blocks 72 through 78 repeat the above-described process for each object comprising the current page until the response to decision block 70 indicates that all objects for the page have been processed. Thereafter, a block 80 provides for writing the tail portions of the object data to memory. In carrying out this step, it will be apparent that all of the header portions of the objects comprising a page are sequentially and contiguously recorded in nonvolatile memory and that the corresponding tail portions are contiguously queued in the same sequence and written to nonvolatile memory after the header portions, as noted in block 80.

The logic then proceeds to decision block 64 to determine if all of the pages of the work have been processed. If not, the next page in the work is processed, as provided in block 66. Once all pages are processed, the logic proceeds to a block 82, indicating that the data for all objects in the multimedia work have been stored in the proper sequence. Once the data for all of the pages and the objects on those pages have been stored in the appropriate sequence as described above, a master CD-ROM can be created by transferring the data file from the nonvolatile memory of the hard drive onto the master CD-ROM, using a conventional CD-ROM recorder. The CD-ROM master can then be employed to produce additional copies of the work for distribution, enabling it to be played on other personal computers.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for minimizing the time required to load data into a computer from a nonvolatile storage device, said data including a plurality of types, each type being associated with a different object of a plurality of objects and including a header section and a tail section, said method comprising the steps of:
 (a) identifying the plurality of objects for which the associated type of data must initially be loaded into the computer;
 (b) determining a sequence for loading the objects; and
 (c) sequentially storing the header sections for the plurality of objects in contiguous blocks on the nonvolatile storage device, in the sequence in which the objects are to be loaded, the header section associated with the plurality of objects being thereby loaded into the computer with a minimum seek time required to access the header sections when needed by the computer.

2. The method of claim 1, further comprising the step of sequentially storing the tail sections for the data associated with the plurality of objects in contiguous blocks on the nonvolatile storage device, in the sequence in which the objects are to be executed.

3. The method of claim 2, wherein the tail section of the data associated with an object is required when the object is executed on the computer and said tail section is loaded into the computer at that time.

4. The method of claim 1, wherein the header section of the data associated with an object is required by a program running on the computer to initially create an instance of the object in a multimedia work executing on the computer.

5. The method of claim 1, further comprising the step of copying the data for the objects from the nonvolatile storage device to a CD-ROM, wherein the blocks of data are arranged in circumferential tracks on the CD-ROM.

6. The method of claim 1, further comprising the step of identifying a plurality of pages with which different objects are associated, and processing the objects on each page to determine the sequence in which the header sections of the data associated with each object on the page are to be stored in blocks on the nonvolatile storage device.

7. The method of claim 1, further comprising the steps of binding the header section of the data associated with each object to a handler for that object prior to storing the header section.

8. A method for minimizing the time required to load data into a computer from a CD-ROM, said data being associated with different objects of a multimedia work, each object being defined by a header section and a tail section, said method comprising the steps of:
 (a) producing a list of pages comprising the multimedia work, each page including at least one object;
 (b) for each page, determining a sequence in which the objects comprising the page will be executed when the multimedia work is run; and
 (c) for each page, storing the header section of the data for the objects comprising the page in contiguous header blocks on the CD-ROM, said header blocks being arranged in accord with said sequence, so that the header sections of the data defining the objects for the page are initially loaded in the order in which the objects are instantiated, thereby reducing the loading time for the page.

9. The method of claim 8, further comprising the step of, for each page, storing the tail section of the data for the objects comprising the page in contiguous tail blocks on the CD-ROM, said tail blocks being stored separately from the header blocks in which the data for the header sections are stored and being arranged in the order in which the objects are executed, so that the tail sections are loaded in the order in which the objects are executed, thereby reducing the time to load the data associated with each object when the object is executed.

10. The method of claim 9, further comprising the step of enabling a user to disable loading the header sections of the data associated with the objects separately from the tail sections of said data.

11. The method of claim 8, wherein each object comprises one of an audio and a visual component.

12. The method of claim 8, further comprising the step of binding each object before storing the data defining it, using a handler that is associated with the object.

13. The method of claim 8, further comprising the step of aligning the data for each object on predefined boundaries of the blocks stored on the CD-ROM.

14. The method of claim 8, further comprising the step of enabling a user to specify the sequence in which data defining each of the objects of a page are loaded and stored on the CD-ROM.

15. The method of claim 8, wherein the pages are generally ordered in a sequence in which the pages are to be executed, so that the data for objects of successive pages are stored on the CD-ROM in a corresponding order, with the data for the header sections of each page's objects preceding the data for the tail sections of said page's objects.

16. A system for creating a multimedia work that is stored on a nonvolatile medium so as to minimize the time required to load the multimedia work for execution on a computer, said system comprising:
 a processor used to create the multimedia work, said processor causing data associated with a plurality of objects comprising the multimedia work to be stored on the nonvolatile medium; and
 a memory in which machine instructions used to control the processor are stored, said machine instructions, when executed by the processor, causing it to:
  (a) determine a header data block and a tail data block for each object;
  (b) store the header data blocks for the objects contiguously and sequentially on the nonvolatile medium; and
  (c) cause the header data blocks for the objects to be loaded into the computer prior to playing a portion of the multimedia work in which the objects are used, thereby minimizing the time required to load the header data blocks for the objects before playing said portion of the multimedia work.

17. The system of claim 16, wherein the machine instructions executed by the processor further cause:

(a) the tail data blocks for the objects to be stored contiguously and sequentially on the nonvolatile medium; and (b) the tail data blocks to be loaded into the computer when said portion of the multimedia work is played by the computer.

18. The system of claim 17, wherein the machine instructions executing on the processor provide a user an option to selectively disable sequential loading of the header data blocks to instantiate the objects before the tail data blocks are loaded to run the portion of the multimedia work, so that the header data blocks and the tail data blocks are both loaded into the computer before the objects are instantiated.

19. The system of claim 16, wherein the portion of the multimedia work comprises a page and the objects of the page comprise at least one of an audio work, a video work, and an animation.

20. The system of claim 16, wherein the machine instructions executing on the processor further cause it to store the data for the objects on the nonvolatile medium in blocks of a predefined size so that the data are aligned with boundaries of said blocks.

21. The system of claim 16, wherein the processor binds each object to an associated handler and determines an initial load size for the data defining each object.

22. The system of claim 16, wherein the processor binds a page comprising the multimedia work and loads an object list for the page before processing the objects to determine the header data blocks and the tail data blocks for the objects.

23. The system of claim 22, wherein the processor processes the objects for a plurality of pages comprising the multimedia work and stores the data for the objects on each page on the nonvolatile medium in an order in which the pages are to be played when the multimedia work is run on the computer.

24. An article of manufacture adapted to be used with a computer, comprising:

a memory medium on which are stored machine instructions for use in minimizing the time required to load data into a computer from a nonvolatile storage device, said data including a plurality of types, each type being associated with a different object of a plurality of objects and including a header section and a tail section, said machine instructions when executed by the computer implementing the following functions:

(a) identifying the plurality of objects for which the associated type of data must initially be loaded into the computer;

(b) determining a sequence for loading the objects; and (c) sequentially storing the header sections for the plurality of objects in contiguous blocks on the nonvolatile storage device, in the sequence in which the objects are to be loaded, the data associated with the plurality of objects being thereby loaded into the computer with a minimum seek time required to access the data when needed by the computer.

25. The article of manufacture of claim 24, wherein the machine instructions further implement the function of sequentially storing the tail sections for the plurality of objects in contiguous blocks on the nonvolatile storage device, in the sequence in which the objects are to be played.

26. The article of manufacture of claim 25, wherein the tail section of the data associated with an object is required when the object is executed on the computer and is loaded into the computer at that time.

27. The article of manufacture of claim 24, wherein the header section of the data associated with an object is required by a program running on the computer to initially create an instance of the object in a multimedia work executing on the computer.

28. The article of manufacture of claim 24, wherein the machine instructions further implement copying the data for the objects from the nonvolatile storage device to a CD-ROM, wherein the blocks of data are arranged in circumferential tracks on the CD-ROM.

29. The article of manufacture of claim 24, wherein the machine instructions further implement identifying a plurality of pages with which different objects are associated, and processing the objects on each page to determine the sequence in which the header sections of the data associated with each object on the page are to be stored in blocks on the nonvolatile storage device.

30. The article of manufacture of claim 24, wherein the machine instructions further implement binding the header section of the data associated with each object to a handler for that object prior to storing the header section.

* * * * *